United States Patent [19]

Grohmann et al.

[11] 4,100,254
[45] Jul. 11, 1978

[54] INDUSTRIAL PROCESS OF PREPARING MAGNESIA OF HIGH PURITY

[75] Inventors: Helmut Grohmann, St. Jakob bei Mixnitz; Michael Grill, Leoben, both of Austria

[73] Assignee: Veitscher Magnesitwerke-Actien-Gesellschaft, Vienna, Austria

[21] Appl. No.: 743,072

[22] Filed: Nov. 18, 1976

[30] Foreign Application Priority Data

Nov. 20, 1975 [AT] Austria ................................. 8837/75

[51] Int. Cl.$^2$ .............................................. C01F 5/06
[52] U.S. Cl. .................................... 423/163; 423/164; 423/166; 423/497; 423/555
[58] Field of Search ............... 423/163, 164, 166, 635, 423/636, 637, 555, 497; 23/300, 304

[56] References Cited

U.S. PATENT DOCUMENTS

| 1,090,125 | 3/1914 | Graves et al. | 423/166 |
| 3,341,290 | 9/1967 | Bornemann et al. | 423/163 |
| 3,980,753 | 9/1976 | Grill et al. | 423/163 |

OTHER PUBLICATIONS

Sienko et al., Chemistry, Second Ed., (1961), McGraw-Hill Book Co., Inc., pp. 344–346.

Primary Examiner—O. R. Vertiz
Assistant Examiner—Wayne A. Langel
Attorney, Agent, or Firm—Kurt Kelman

[57] ABSTRACT

In an industrial process of preparing high-purity magnesia from an impure magnesium-containing starting material, wherein the starting material is dissolved in HCl and the resultant acidic solution is subjected to a multi-step treatment for precipitating the impurities out of the solution, the precipitate is separated from the residual purified magnesium chloride solution, and the magnesium chloride is thermally decomposed to obtain magnesia, the purified magnesium chloride solution is first concentrated and sulfate ions are then added thereto to precipitate calcium ions from the concentrated solution as calcium sulfate.

10 Claims, 1 Drawing Figure

U.S. Patent  July 11, 1978  4,100,254
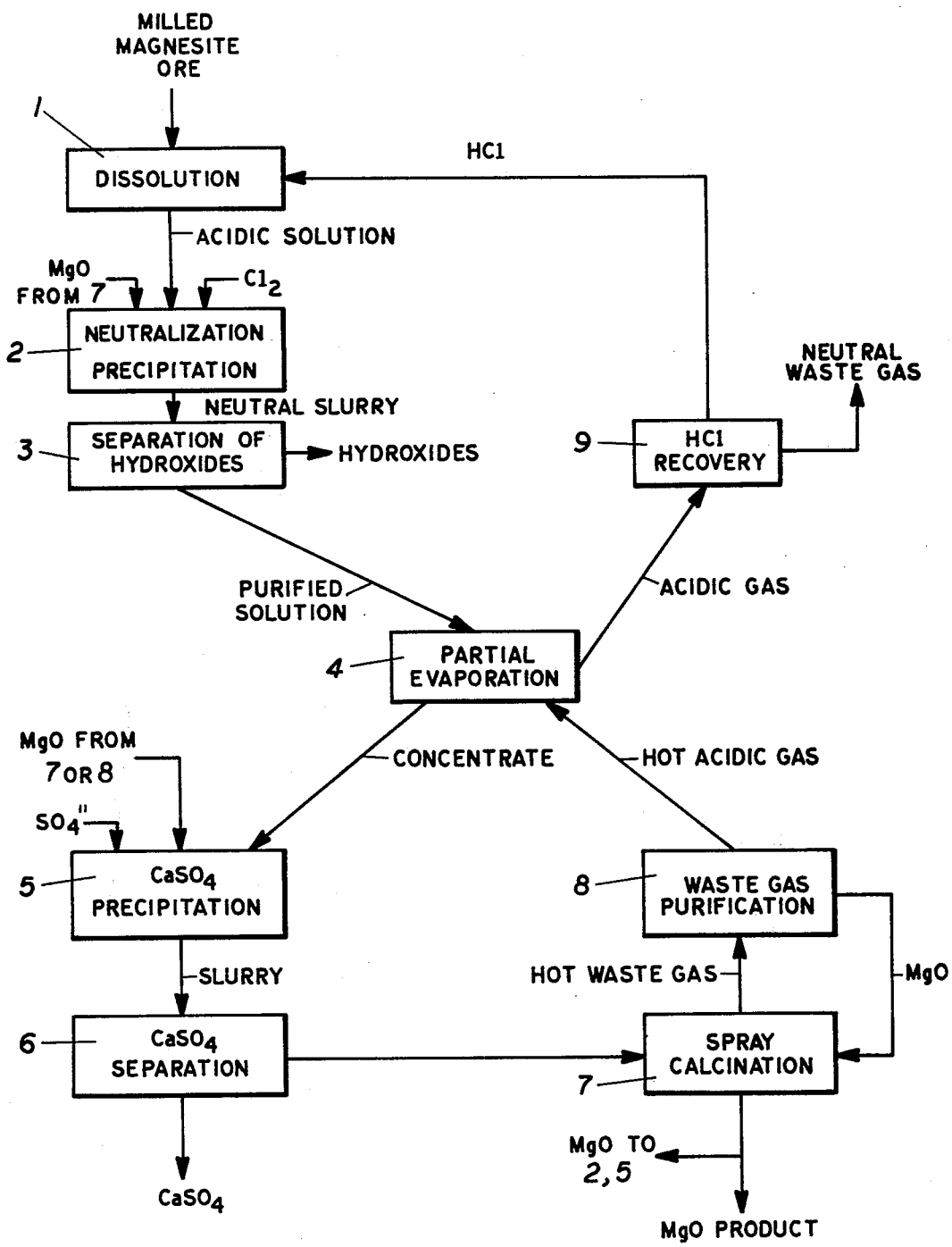

INDUSTRIAL PROCESS OF PREPARING MAGNESIA OF HIGH PURITY

The present invention relates to improvements in an industrial process of preparing magnesia of high purity from a magnesium-containing starting material containing impurities.

In a known industrial process of this type, the starting material is dissolved in aqueous hydrochloric acid to produce an acidic solution, of the starting material and the acidic solution of the starting material is subjected to a multi-step treatment wherein the impurities are precipitated from the solution and the precipitate is separated from the residual purified solution. A first step in the purification treatment includes precipitating impurities, e.g. an iron compound, as hydroxides, and separating the precipitate from the residual magnesium chloride solution, and a second treatment step precipitating calcium, present in the magnesium chloride solution, by adding sulfate ions containing material and separating the precipitate. The magnesium chloride in the purified solution then is thermally decomposed to obtain magnesia, and the magnesia is recovered.

In this conventional industrial process, the impurities of the starting material, normally derived from magnesite ores or magnesite waste coming from the magnesite industry, being eliminated in the purification process by precipitation from the solution of the starting material. In the first step in the purification treatment of this known industrial process, any iron, aluminum, chromium and manganese containing impurities are converted by hydrolysis to hydroxides and the hydroxides are substantially completely precipitated from the acidic magnesium chloride solution, any $SiO_2$, $TiO_2$ and $B_2O_3$ in the solution being coprecipitated with the hydroxides. This precipitation is obtained by suitably adjusting the pH of the magnesium chloride solution, preferably to the range of 4 to 9, which may be accomplished by adding to the acidic solution a magnesium and/or calcium compound. The precipitate is separated from the residual magnesium chloride solution which, however, still contains calcium ions as an impurity. Those calcium ions may originate from the starting material and/or from material added for promotion of precipitation during the first step of purification treatment. The calcium ions can be removed as calcium sulfate by adding sulfate ions to the magnesium chloride solution. After the sulfate ions have reacted with the calcium ions, the resultant calcium sulfate is precipitated from the solution and separation of calcium sulfate is carried out. After this second purification treatment step, the magnesium chloride solution is concentrated and moved into a kiln where it is thermally decomposed to obtain the purified magnesia. A process of this general type is described, for instance, in U.S. Pat. No. 3,980,753, dated Sept. 14, 1976, whose disclosure is herein incorporated by reference. The improvement provided by the invention is, however, not limited to the specific process parameters of the patented process, except insofar as claimed herein.

It has also been proposed to add the sulfate ions to the solution of the starting material before the first treatment step so as to precipitate a substantial portion of the calcium impurities from the solution at this stage and, in the second stage, to adjust the pH and the temperature of the solution to optimal values for the precipitation of the calcium ions from the magnesium chloride solution.

In either procedure, the precipitation and separation of the calcium sulfate resulting from the addition of sulfate ions to the solution causes some difficulties because the precipitation conditions are such that the precipitation of calcium sulfate proceeds relatively slowly and the magnesium chloride solution is practically saturated or even supersaturated with calcium sulfate from the time the sulfate ions are added to the time the solution is introduced into the kiln for decomposition of the magnesium chloride. In such a saturated or supersaturated solution, the calcium sulfate constantly tends to precipitate, causing clogging or deposits on all portions of the apparatus in contact with the solution.

It is the primary object of this invention to improve the industrial process of the indicated type by removing the calcium impurities from the magnesium chloride solution in a very economical and effective manner, and avoiding the tendency of undesirable scale formations leading to interruptions in the production, caused by the requirement to remove the calcium sulfate deposits.

The above and other objects are accomplished in accordance with the invention by first concentrating the magnesium chloride solution in the second treatment step and then adding thereto sulfate ions containing material to precipitate the calcium ions from the concentrated solution as calcium sulfate.

A large part of the apparatus is kept free of calcium sulfate deposits when the sulfate ions are added to the concentrated solution and the calcium sulfate is precipitated therefrom. Furthermore, adding the sulfate ions to the concentrated solution also substantially increases the speed and efficiency of the calcium sulfate precipitation. This is presumably due to the fact that the solubility of calcium sulfate in a magnesium chloride solution is inversely proportional to the concentration of magnesium chloride in the solution and the temperature of the solution, i.e. the solubility of calcium sulfate decreases as the magnesium chloride content and the temperature of the solution increases. Thus, the improvement provided by the present invention makes it possible practically completely to remove the precipitated calcium sulfate from the magnesium chloride solution in a very simple manner.

According to a preferred embodiment of this invention, the sulfate ions are added in the form of magnesium sulfate since this facilitates the adjustment of the pH to a value most desirable to effectuate the precipitation of the calcium sulfate, for instance a pH of 1 to 4, and also reduces the introduction of other impurities into the magnesium chloride solution. The magnesium sulfate may be added in solid form or in the form of a slurry or solution in an amount sufficient to precipitate the calcium ions substantially completely. The sulfate ions may also be added in the form of sulfuric acid, which is a very simple procedure, makes exact dosing of the sulfate ions possible and also introduces no other impurities.

In accordance with another preferred embodiment of the invention, magnesia is added to the magnesium chloride solution during the second treatment step wherein the calcium ions are precipitated from the solution. This provides a good control of the parameters which determine the precipitation as well as the subsequent thermal decomposition. This magnesia may be advantageously taken from the kiln in which the magnesium chloride is thermally decomposed. Preferably, magnesia carried by the flue gases exhausted from the kiln is separated from the flue gases and used for this purpose since this magnesia has a very favorable particle size for the purpose and would, otherwise, have to be after-treated because it is an incomplete magnesium chloride-magnesia conversion product.

According to another preferred embodiment, the sulfate ions may be added in the form of a sulfur-containing substance derived from flue gases. For this purpose, magnesia may be added to the fuel oil of a burner, the sulfur contained in the fuel oil being converted into magnesium sulfite during combustion of the fuel oil. The magnesium sulfite is then converted to magnesium sulfate and this is added to the magnesium chloride solution as the required sulfate ion source. In this manner, sulfur pollution is eliminated and the otherwise noxious sulfur production is used effectively as a source of sulfate ions required for the process of the invention.

Preferably, the purified magnesium chloride solution is concentrated in the second treatment step to a content of more than 350, most preferably more than 380, grams of $MgCl_2$/liter of solution. With such a solids concentration, the calcium precipitation and separation from the solution proceeds particularly smoothly. The preferred temperature range for the precipitation in the second treatment step is between about 60° and 120° C, the solution being most preferably heated to a temperature of about 100° C.

The above and other objects, advantages and features of this invention will become more apparent from the following detailed description of a now preferred embodiment thereof, taken in conjunction with the accompanying drawing showing in a single FIGURE and schematically an installation for the multi-step process.

Referring now to the drawing, there is shown step 1 wherein impure magnesium carbonate in the form of milled magnesite ore is dissolved in hydrochloric acid. Any suitable magnesium-containing starting material may be used such as materials consisting essentially of magnesium carbonate, magnesium oxide, magnesium hydroxide, or mixtures thereof, and containing, as impurities, calcium compounds and at least one member of the group consisting of iron, aluminum, chromium, manganese, silicon, titanium and boron compounds. The hydrochloric acid may be used in an aqueous solution of 15% to 32%, by weight, HCl concentration. The reaction mixture is stirred in the reaction vessel to produce an acidic magnesium chloride solution containing the impurities of the starting material. This solution is delivered to step 2 of the process wherein magnesia or calcium hydroxide or another suitable neutralizing agent is added to the solution to substantially neutralize the same, preferably to a pH range of 4 to 9, whereby the iron, aluminum, chromium and manganese oxides are precipitated from the solution and the silica, titania and boron oxide are coprecipitated. If the acidic $MgCl_2$ solution contains divalent manganese as an impurity, an oxidizing agent, such as elemental chlorine gas, is introduced into the substantially neutralized solution in an amount sufficient to convert the divalent to trivalent manganese.

The precipitated impurities are separated from the residual purified magnesium chloride solution in step 3 by sedimentation and/or filtration. This magnesium chloride solution is then heated in step 4 to concentrate its solids content. Step 4 may be carried out in a washing and recovery apparatus through which the solution to be concentrated is conducted and to which hot waste gases exhausted from other stages of the process are delivered for heat exchange with the solution. A concentrated acidic magnesium chloride solution is recovered from the outlet of this apparatus, which is free of the above-named impurities but still contains calcium ions in the form of calcium chloride, the calcium oxide of the starting material having been converted to $CaCl_2$ in the HCl solution.

In step 5, sulfate ions are added, for instance in the form of magnesium sulfate or sulfuric acid, to the concentrated solution to convert at least the preponderate portion of the calcium ions dissolved in the solution into calcium sulfate which is precipitated from the solution. A suspension of calcium sulfate in a magnesium chloride solution is discharged from step 5.

The solid calcium sulfate is separated from the magnesium chloride solution in step 6 and a pure solution of $MgCl_2$ is recovered from step 6 which contains no more than traces of dissolved calcium sulfate.

Preferably, the magnesium chloride solution is neutralized in step 5 by the addition of magnesia, the magnesia additions in steps 2 and 5 being advantageously taken from the kiln in which the purified magnesium chloride is thermally decomposed to obtain magnesia of high purity. This thermal decomposition is effected in step 7 wherein the magnesium chloride solution is sprayed into a calcining kiln. From the main stream of magnesia discharged from the kiln two partial streams are separated, one of which is delivered to step 2 and the other one to step 3.

The waste gases exhausted from the kiln have pulverized magnesia suspended therein. These gases have a temperature of about 500° C and are delivered to waste gas purification plant 8 where the finely comminuted solids, primarily magnesia, are separated from the gas. The separated solids are recycled to the process, for instance at step 5. The purified waste gas is comprised primarily of nitrogen, water vapor, carbon dioxide and hydrochloric acid. It is recycled to step 4 where it undergoes heat exchange with the magnesium chloride solution to concentrate the same.

After passing through concentrating step 4, the hydrochloric acid portion of the waste gases is separated from the gases at step 9 by absorption in water, such absorption being effected advantageously in an adiabatic column to produce an aqueous hydrochloric acid solution which may be recycled for use in step 1 for dissolving the starting material.

The following specific examples will further illustrate the practice of the industrial process, all percentages being by weight.

EXAMPLE 1

In a plant of the illustrated type, 9,828 kg magnesite was dissolved in a reaction vessel in 40,000 liter of an aqueous hydrochloric acid solution at a temperature of 85° C, the HCl solution having a concentration of 209 g HCl/liter. The magnesite had the following composition:

| | |
|---|---|
| Ignition loss | 49.0% |
| $SiO_2$ | 3.14% |
| $Fe_2O_3$ | 1.41% |
| $Al_2O_3$ | 0.15% |
| CaO | 2.38% |
| MgO | 43.8% |

Simultaneously with the magnesite, 737 kg kieserite (containing 354 kg SO₃) was added to the reaction vessel.

The iron and aluminum oxides were precipitated from the hydrochloric acid solution in the form of their hydroxides and the silica in the form of dissolved silicilic acid by adding to the solution 147 kg magnesia and 9 kg chlorine gas. The resultant slurry was filtrated, the hydroxide filter cake was separated and the clear filtrate, which will be called the solution hereinafter, was stored in a tank for 8 hours at a temperature of 60° C. After storing, the solution was filtered to separate therefrom any precipitated calcuim sulfate. In this filtration, 40 kg calcium sulfate in the form of $CaSO_4 \cdot \frac{1}{2}H_2O$ and $CaSO_4 \cdot 2H_2O$ was removed. The filtered solution was now again stored in another tank as a purified solution and, after an additional 8 hours of storage in the other tank, the purified magnesium chloride solution was sprayed into a calcining kiln where it was converted into magnesia and hydrochloric acid. The magnesia contained 1.34% CaO and 2.36 $SO_3$.

In the following analysis, the following calcium balance was found:

| | Calcium oxide (CaO) | |
|---|---|---|
| | kg | % |
| Introduced with the magnesite | 234 = | 100 |
| Removed with the hydroxide filter cake | 58.5 | 25 |
| Sediment in first storage tank | 77.2 | 33 |
| Removed in the CaSO₄ filtration | 16.4 | 7 |
| Sediment in second storage tank and scale deposits in the pipes | 23.4 | 10 |
| Remaining in the end product | 58.5 | 25 |

EXAMPLE 2

Example 1 was repeated to the point where the hydroxide filter cake was separated, but no kieserite was fed to the reaction vessel with the magnesite, to leave 40,000 liter clear magnesium chloride solution containing 10,025 kg $MgCl_2$, 442 kg $CaCl_2$ and 36,069 kg $H_2O$. This solution was stored in a tank and the stored solution was delivered to a concentrating plant according to step 4 in the drawing where the solution was brought into heat exchange contact with waste gases exhausted from the kiln to concentrate the solution. The concentrated solution was removed from the step 4 concentrating plant at a temperature of 100° C and contained 13,366 kg magnesium chloride, 422 kg calcium chloride and 29,238 kg water.

As shown in step 5 of the drawing, the concentrated solution was stirred in a vessel with 712 kg kieserite containing 354 kg sulfate ions ($SO_3$). After 5 hours, the calcium sulfate consisting of the anhydride and various hydrates of $CaSO_4$ precipitated from the reaction mixture was removed by filtration in step 6. The clear, concentrated filtrate was stored again and then delivered to the kiln for conversion to magnesia and hydrochloric acid. The magnesia contained 0.42% CaO and 1.38% $SO_3$.

Analysis showed the following calcium balance:

| | Calcium oxide (CaO) | |
|---|---|---|
| | kg | % |
| Introduced with the magnesite | 234 = | 100 |
| Removed with the hydroxide filter cake | 10 | 4 |
| Sediment in first storage tank | 0 | 0 |
| Removed in the CaSO₄ filtration | 106 | 88 |
| Sediment in the second storage tank | | |

-continued

| | Calcium oxide (CaO) | |
|---|---|---|
| | kg | % |
| and scale deposits in the pipes | 0 | 0 |
| Remaining in the end product | 18 | 8 |

Thus, in contrast to the conventional procedure in Example 1, no calcium sulfate deposits were found in this procedure according to the invention.

EXAMPLE 3

Example 2 was repeated but, instead of supplying 354 kg $SO_3$ in the form of kieserite, this amount of sulfate ions was added to the solution in the form of 452 kg of sulfuric acid. The hydrochloric acid and water vapor exhausted from the reaction vessel was delivered to step 9 for recovery of HCl and, after the solution was stored for 5 hours, it was treated in the manner of Example 2. The resultant magnesia had a content of 0.38% CaO and 1.32% $SO_3$.

EXAMPLE 4

Example 3 was repeated but the pH of the reaction mixture resulting from the addition of sulfuric acid to the solution was adjusted to about 4 by the addition of magnesia. The resultant magnesia contained 0.30% CaO and 1.21% $SO_3$.

What is claimed is:

1. In an industrial process of preparing magnesia of high purity from a magnesium-containing starting material containing impurities which comprises
   (a) dissolving the starting material in aqueous hydrochloric acid to produce an acidic solution of the starting material, and
   (b) subjecting the acidic solution of the starting material to a multi-step treatment wherein the impurities are precipitated from the solution and the precipitate is separated from the residual purified solution, said multi-step treatment comprising
      (1) a first step in the purification treatment including precipitating impurities as hydroxides and separating the precipitate from the residual magnesium chloride solution, and
      (2) a second treatment step including precipitating calcium present in the magnesium chloride solution by adding sulfate ions containing material and separating the precipitate, said calcium originating from the starting material and/or from material added for promotion of precipitation during the first step of the treatment, and
   (c) thermally decomposing the magnesium chloride in the purified solution to obtain magnesia, and recovering the magnesia,
   the improvement of first concentrating the magnesium chloride solution in the second treatment step to a content of more than 350 grams $MgCl_2$/liter and then adding thereto the sulfate ions containing material to precipitate the calcium ions from the concentrated solution as calcium sulfate.

2. In the industrial process of claim 1, the step of adding magnesia to the solution during the second treatment step.

3. In the industrial process of claim 2, the magnesia added to the solution during the second treatment step is taken from the magnesia obtained by thermally decomposing the magnesium chloride.

4. In the industrial process of claim 3, magnesia obtained by thermally decomposing the magnesium chloride is carried by flue gases generated by the thermal decomposition, the magnesia is separated from the flue gases, and the separated magnesia is added to the solution during the second treatment step.

5. In the industrial process of claim 1, the step of heating the purified chloride solution in the second treatment step to a temperature of about 60° to 120° C.

6. In the industrial process of claim 5 the step of heating the purified chloride solution in the second treatment step to a temperature about 100° C.

7. In the industrial process of claim 1, the step of adding the sulfate ions to the purified magnesium chloride solution in the form of magnesium sulfate.

8. In the industrial process of claim 1, the step of adding the sulfate ions to the purified magnesium chloride solution in the form of sulfuric acid.

9. In the industrial process of claim 1, the step of adding the sulfate ions to the purified magnesium chloride solution in the form of a sulfur-containing substance derived from heating waste gases.

10. In the industrial process of claim 1, the purified magnesium chloride solution is concentrated in the second treatment step to a content of more than 380 g $MgCl_2$/liter of the solution before the sulfate ions are added.

* * * * *